No. 837,109. PATENTED NOV. 27, 1906.
M. OTTO.
WATER STERILIZING APPARATUS.
APPLICATION FILED OCT. 19, 1905. RENEWED OCT. 9, 1906.
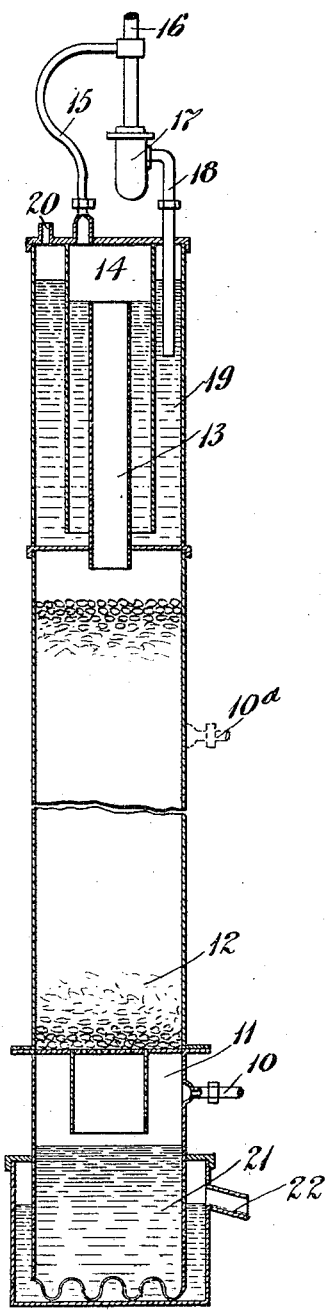

UNITED STATES PATENT OFFICE.

MARIUS OTTO, OF PARIS, FRANCE, ASSIGNOR TO AMERICAN OZONE COMPANY, OF NIAGARA FALLS, NEW YORK, A CORPORATION OF NEW YORK.

WATER-STERILIZING APPARATUS.

No. 837,109.  Specification of Letters Patent.  Patented Nov. 27, 1906.

Application filed October 19, 1905. Renewed October 9, 1906. Serial No. 338,185.

*To all whom it may concern:*

Be it known that I, MARIUS OTTO, a citizen of the Republic of France, and a resident of Paris, France, have invented certain new and useful Improvements in Water-Sterilizing Apparatus, of which the following is a specification.

The object of my invention is to provide an improved apparatus for effecting the thorough mixture of ozone and water, thereby increasing the sterilization of the water.

The construction involved in my invention comprises an emulsifier and a Gay-Lussac column, together with other details, all of which will be clearly understood from the description of my invention with reference to the accompanying drawing.

The drawing illustrates in vertical section a form of apparatus for carrying out my invention.

In the apparatus shown in the drawing, 10 indicates a pipe by which ozone or ozonized air from any suitable source enters into a chamber 11. From the chamber 11 the ozone passes up through a Gay-Lussac column 12. Arriving at the top of the Gay-Lussac column 12 the ozone ascends through a central tube 13 into a chamber 14, from which it is drawn through a pipe 15 into communication with the water entering by a supply-pipe 16. The water from the supply-pipe 16 carries with it the ozone and empties into an emulsifier 17, where the ozone and the water are mixed together. From the emulsifier 17 the mixed ozone and water pass through a pipe 18, which discharges into the descending arm of a hydraulic seal 19. The ozone and water are here further mixed and the sterilization carried on. The excess ozone rises off the water in the descending leg and escapes through the outlet-port 20. The water with the ozone dissolved in it rises in the ascending leg of the hydraulic seal 19 and spills over into the central tube 13, already referred to, where it comes in contact with the rising ozone and falls upon the top of the Gay-Lussac column. Passing down through the Gay-Lussac column containing the rising ozone the water comes into intimate contact with the ozone and the sterilization is completed. The sterilized water from the Gay-Lussac column falls into a lower hydraulic seal 21. The water here has a chance to give up the unused ozone, which rises from the water in the descending leg and passes up through the apparatus again, with the new ozone entering through the pipe 10, as already explained. The sterilized water having given up the unused ozone discharges through any suitable outlet, such as 22, ready for consumption. The Gay-Lussac column 12 forms the primary mixer, while the hydraulic seal 19 forms the secondary mixer. If desired, in cases where the Gay-Lussac column 12 is especially long additional ozone-supply pipes, such as $10^a$, may be added to the apparatus.

It is obvious that any suitable gas other than ozone or ozonized air might be employed for the sterilization without departing from the spirit of my invention.

Having thus described my invention, the following is what I claim as new therein and desire to secure by Letters Patent:

1. In a water-sterilizing apparatus, the combination with an emulsifier, a mixer, means for supplying water to said emulsifier, and means for supplying ozone to said mixer; of a hydraulic seal with a discharge-pipe leading to said mixer and adapted to permit ozone to ascend through it from said mixer, and means for leading the ascending ozone to said emulsifier.

2. In an apparatus for sterilizing water, the combination with a sterilizing-column, means for supplying ozone thereto, and a hydraulic seal discharging into the sterilizing-column and receiving ozone ascending from the sterilizing-column; of an emulsifier discharging into said hydraulic seal, and a suction-pipe leading from the hydraulic seal to the emulsifier.

MARIUS OTTO.

Witnesses:
LOUIS GARDET,
FREDERIC CAULDWELL.